United States Patent
Mitrovic

(10) Patent No.: US 11,377,199 B2
(45) Date of Patent: Jul. 5, 2022

(54) PLANETARY GEARBOX FOR GAS TURBINE ENGINE

(71) Applicant: PRATT & WHITNEY CANADA CORP., Longueuil (CA)

(72) Inventor: Lazar Mitrovic, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 284 days.

(21) Appl. No.: 16/832,785

(22) Filed: Mar. 27, 2020

(65) Prior Publication Data

US 2021/0229796 A1 Jul. 29, 2021

Related U.S. Application Data

(60) Provisional application No. 62/966,735, filed on Jan. 28, 2020.

(51) Int. Cl.
  *F16H 1/28* (2006.01)
  *B64C 11/46* (2006.01)
  (Continued)

(52) U.S. Cl.
  CPC .............. *B64C 11/46* (2013.01); *B64D 35/02* (2013.01); *F02C 7/36* (2013.01); *F16H 1/28* (2013.01);
  (Continued)

(58) Field of Classification Search
  CPC ......... B64C 11/46; B64D 35/02; B64D 35/00; F16H 1/28; F16H 57/08
  See application file for complete search history.

(56) References Cited

U.S. PATENT DOCUMENTS

| 5,054,998 A | 10/1991 | Davenport |
| 6,302,356 B1 | 10/2001 | Hawkins |

(Continued)

FOREIGN PATENT DOCUMENTS

| EP | 3361122 | 8/2018 |
| EP | 3572690 | 11/2019 |
| JP | 5379240 | 12/2013 |

OTHER PUBLICATIONS

Secretariat: "EDTO Workshop Module N° 3-Approval", Course On Extended Diversion Time Operations (EDTO) and in Flight Fuel Management, Oct. 3, 2014 (Oct. 3, 2014), pp. 1-57, XP055804396, Retrieved from the Internet:URL:https://www.icao.int/SAM/Documents/2014-EDTO/EDTO%20Module%20%203%20-%20Approval%20Process. pdf.

(Continued)

*Primary Examiner* — Derek D Knight
(74) *Attorney, Agent, or Firm* — Norton Rose Fulbright Canada LLP

(57) ABSTRACT

An aircraft includes first and second engines, one or more aircraft rotors associated with the first and second engines, a first epicyclic gearbox having: a) an output operatively connected to at least one of the one or more aircraft rotors, and b) an input defined by a sun gear of the first epicyclic gearbox; and a second epicyclic gearbox having: a) an output operatively connected to at least one of the one or more aircraft rotors, and b) an input defined by a sun gear of the second epicyclic gearbox. Output of the first epicyclic gearbox is defined by the carrier. Output of the second epicyclic gearbox is defined by its ring gear. A multi-engine aircraft and a method of operating a multi-engine aircraft are also described.

20 Claims, 9 Drawing Sheets

(51) Int. Cl.
  *B64D 35/02* (2006.01)
  *F02C 7/36* (2006.01)
  *F16H 57/02* (2012.01)
  *F16H 57/08* (2006.01)
  *F16H 1/32* (2006.01)

(52) U.S. Cl.
  CPC ............ *F16H 57/02* (2013.01); *F16H 57/08* (2013.01); *F05D 2220/323* (2013.01); *F05D 2260/40311* (2013.01); *F16H 1/32* (2013.01); *F16H 2001/2872* (2013.01); *F16H 2057/02043* (2013.01)

(56) References Cited

U.S. PATENT DOCUMENTS

| | | | |
|---|---|---|---|
| 2018/0230902 A1* | 8/2018 | Desjardins | ............ F02C 3/107 |
| 2018/0283503 A1 | 10/2018 | Georgiev et al. | |
| 2019/0085941 A1 | 3/2019 | Klassen et al. | |
| 2019/0360356 A1* | 11/2019 | Savaria | ................ F16H 57/082 |

OTHER PUBLICATIONS

European Search Report dated May 26, 2021 for EP Application No. 21154008.3, filed Jan. 28, 2021.

* cited by examiner

```
┌─────────────────────┐   ┌─────────────────────┐   ┌─────────────────────┐
│ Rotate a sun gear   │   │ Rotating a planetary│   │ Rotating a ring gear│
│ of a first planetary│──▶│ gear carrier of the │──▶│ of the second       │
│ gearbox and a sun   │   │ first planetary     │   │ planetary gearbox   │
│ gear of a second    │   │ gearbox relative to │   │ relative to a       │
│ planetary gearbox,  │   │ a ring gear of the  │   │ planetary gear      │
│ the sun gears meshed│   │ first planetary     │   │ carrier of the      │
│ to respective       │   │ gearbox and transmit│   │ second planetary    │
│ planetary gears of  │   │ rotation of the     │   │ gearbox and transmit│
│ the first and second│   │ planetary gear      │   │ rotation of the ring│
│ planetary gearboxes.│   │ carrier of the first│   │ gear of the second  │
│                     │   │ planetary gearbox to│   │ planetary gearbox to│
│                     │   │ a first rotor shaft │   │ a second rotor shaft│
│                     │   │ of the aircraft.    │   │ of the aircraft.    │
└─────────────────────┘   └─────────────────────┘   └─────────────────────┘
```

*FIG. 9*

PLANETARY GEARBOX FOR GAS TURBINE ENGINE

CROSS-REFERENCE

The present application claims the benefit of priority to U.S. Patent Application No. 62/966,735 filed Jan. 28, 2020, entitled "PLANETARY GEARBOX FOR GAS TURBINE ENGINE", the entire contents of which are incorporated herein by reference.

TECHNICAL FIELD

The present disclosure relates generally to aircraft engines and, more particularly, to gearboxes used in an aircraft engine such as a gas turbine engine.

BACKGROUND

Turboprops are gas turbine engines coupled to a propeller via a reduction gearbox. One known type of reduction gearbox is a planetary gearbox. Contrary to a turbofan engine, in which bypass airflow and core exhaust airflow are used to generate thrust, a turboprop engine drives a propeller to generate forward motion. However, the rotational speed of the turbine may be too high to be directly coupled to the propeller. Accordingly, prior art reduction gearboxes exist for reducing the rotational speed of the propeller(s) relative to the turbine(s). While prior art gearbox arrangements may be suitable for their intended purposes, improvement in the aerospace industry is always desirable.

SUMMARY

In an aspect, there is provided an aircraft, comprising: first and second engines; one or more aircraft rotors associated with the first and second engines; a first epicyclic gearbox having: a) an output operatively connected at least one of the one or more aircraft rotors, and b) an input defined by a sun gear of the first epicyclic gearbox; and a second epicyclic gearbox having: a) an output operatively connected to at least one of the one or more aircraft rotors, and b) an input defined by a sun gear of the second epicyclic gearbox; and wherein: the first engine is operatively connected to the input of the first epicyclic gearbox; the second engine is operatively connected to the input of the second epicyclic gearbox; each of the first and second epicyclic gearboxes has gears carried by a carrier, and a ring gear meshed with the gears, the output of the first epicyclic gearbox is defined by the carrier of the first epicyclic gearbox, and the output of the second epicyclic gearbox is defined by the ring gear of the second epicyclic gearbox.

In some embodiments, rotation of the ring gear of the first epicyclic gearbox is blocked and rotation of the carrier of the second epicyclic gearbox is blocked.

In some embodiments, each gear of the gears of the carrier of the second epicyclic gearbox includes: a larger-radius gear meshed with the sun gear of the second epicyclic gearbox; a smaller-radius gear attached to that larger-radius gear and meshed with the ring gear of the second epicyclic gearbox, that larger-radius gear, that smaller-radius gear and the ring gear forming an interconnected set of three gears; one tooth of each gear in the interconnected set of three gears is aligned with one tooth of each of the other two gears in the interconnected set of three gears; each gear of the second epicyclic gearbox has a number of teeth; the number of teeth of all three gears of the interconnected set of three gears is one of even and odd; and the number of teeth of each of the sun gear and the ring gear of the second epicyclic gearbox is divisible by the number of gears of the carrier of the second epicyclic gearbox.

In some embodiments, in each gearbox of the first and second epicyclic gearboxes, each of the gears of the carrier of that gearbox includes: a larger-radius gear meshed with the sun gear of that gearbox, a smaller-radius gear attached to that larger-radius gear and meshed with the ring gear of that gearbox, and teeth of the larger-radius gear, the smaller-radius gear, and the ring gear are shaped such that, when rotating: a) an apex of each tooth of the teeth of the larger-radius gear passes through a top-dead-center position concurrently with an apex of a tooth of the teeth of the smaller-radius gear, and b) when in the top-dead-center position the apex of the tooth of the smaller-radius gear aligns with trough of a space between teeth of the ring gear engaged at that time by the tooth of the smaller-radius gear.

In some embodiments, the output of the second epicyclic gearbox is operatively connected the at least one of the one or more aircraft rotors via a rotor shaft assembly; and the ring gear of the second epicyclic gearbox has a radially-inward facing surface and a radially-outward facing surface, and: includes teeth on both the radially-inward facing surface and the radially-outward facing surface, is mated with the smaller gear of each of the gears of the carrier of second epicyclic gearbox via the teeth on the radially-inward facing surface, and is connected to the rotor shaft assembly via a splined connection that includes the teeth on the radially-outward facing surface.

In some embodiments, the rotor shaft assembly includes a ring gear coupling; and the ring gear coupling has teeth mated with the teeth on the radially-outward facing surface of the ring gear of the second epicyclic gearbox and defining the splined connection.

In some embodiments, the aircraft comprises a marking provided on each of the larger-radius gears, on each of the smaller-radius gears, and on each of the ring gears, at respective locations corresponding to the top-dead-center position.

In some embodiments, the second epicyclic gearbox includes a housing; the ring gear coupling, the ring gear, the carrier, and the sun gear of the second epicyclic gearbox are disposed inside the housing; and the carrier of the second epicyclic gearbox is splined to the housing.

In some embodiments, the housing includes a rear portion and a front portion operatively connected to the rear portion to be removable from the rear portion; and the rotor shaft assembly is connected to the front portion so as to be removable relative to the rear portion together with the front portion.

In some embodiments, the first engine drives the sun gear of the first epicyclic gearbox in a given direction when the first engine operates, and the second engine drives the sun gear of the second epicyclic gearbox in the given direction when the second engine operates.

In another aspect, there is provided a multi-engine aircraft with multiple aircraft rotors, comprising: a first engine operatively connected to an input of a first epicyclic gearbox, the input of the first epicyclic gearbox defined by a sun gear thereof, the first epicyclic gearbox having an output operatively connected to a first aircraft rotor of the multiple aircraft rotors; and a second engine operatively connected to an input of a second epicyclic gearbox, the input of the second epicyclic gearbox defined by a sun gear thereof, the second epicyclic gearbox having an output operatively connected to a second aircraft rotor of the multiple aircraft rotors; and wherein each of the first and second epicyclic gearboxes has gears carried by a carrier and a ring gear meshed with the gears of that carrier, the output of the first epicyclic gearbox is defined by the carrier of the first epicyclic gearbox, and the output of the second epicyclic gearbox is defined by the ring gear of the second epicyclic gearbox.

In some embodiments, rotation of the ring gear of the first epicyclic gearbox is limited statically or variably, and rotation of the carrier of the second epicyclic gearbox is limited statically or variably.

In some embodiments, rotation of the ring gear of the first epicyclic gearbox is limited statically, and rotation of the carrier of the second epicyclic gearbox is limited statically.

In another aspect, there is provided a method of operating a multi-engine aircraft having first and second gas turbine engines, the method comprising: rotating a sun gear in a first epicyclic gearbox of the first gas turbine engine and rotating a sun gear in a second epicyclic gearbox of the second gas turbine engine, the sun gears meshed to respective gears of the carriers of the first and second epicyclic gearboxes; rotating a carrier of the first epicyclic gearbox relative to a ring gear of the first epicyclic gearbox and transmitting rotation of the carrier of the first epicyclic gearbox to a first rotor shaft of the aircraft; and rotating a ring gear of the second epicyclic gearbox relative to a carrier of the second epicyclic gearbox and transmitting rotation of the ring gear of the second epicyclic gearbox to a second rotor shaft of the aircraft.

In some embodiments, the method comprises limiting rotation of at least one of: the ring gear of the first epicyclic gearbox; and the carrier of the second epicyclic gearbox.

In some embodiments, the transmitting rotation of the ring gear of the second epicyclic gearbox to the second rotor shaft is performed via a radially-outward facing surface of the ring gear of the second epicyclic gearbox.

In some embodiments, the rotating the sun gear of the first epicyclic gearbox is in a same direction as the rotating the sun gear of the second epicyclic gearbox.

In some embodiments, the method comprises transmitting rotation of the first rotor shaft to a first rotor of the aircraft, and transmitting rotation of the second rotor shaft to a second rotor of the aircraft.

In some embodiments, the first and second rotors are first and second propellers, respectively.

In some embodiments, the rotating the sun gear of the first epicyclic gearbox is performed via a turbine section of a first gas turbine engine of the aircraft; and the rotating the sun gear of the second epicyclic gearbox is performed via a turbine section of a second gas turbine engine of the aircraft.

The above are examples of possible embodiments of the present technology, and are therefore non-limiting.

BRIEF DESCRIPTION OF THE DRAWINGS

Reference is now made to the accompanying figures in which:

FIG. 9 is a method of operating a multi-engine aircraft.

DETAILED DESCRIPTION

In at least some of the figures that follow, some elements appear more than once (e.g. there may be two, three, etc. of a given part in a given embodiment). Accordingly, only a first instance of each given element is labeled, to maintain clarity of the figures.

Figure 1:
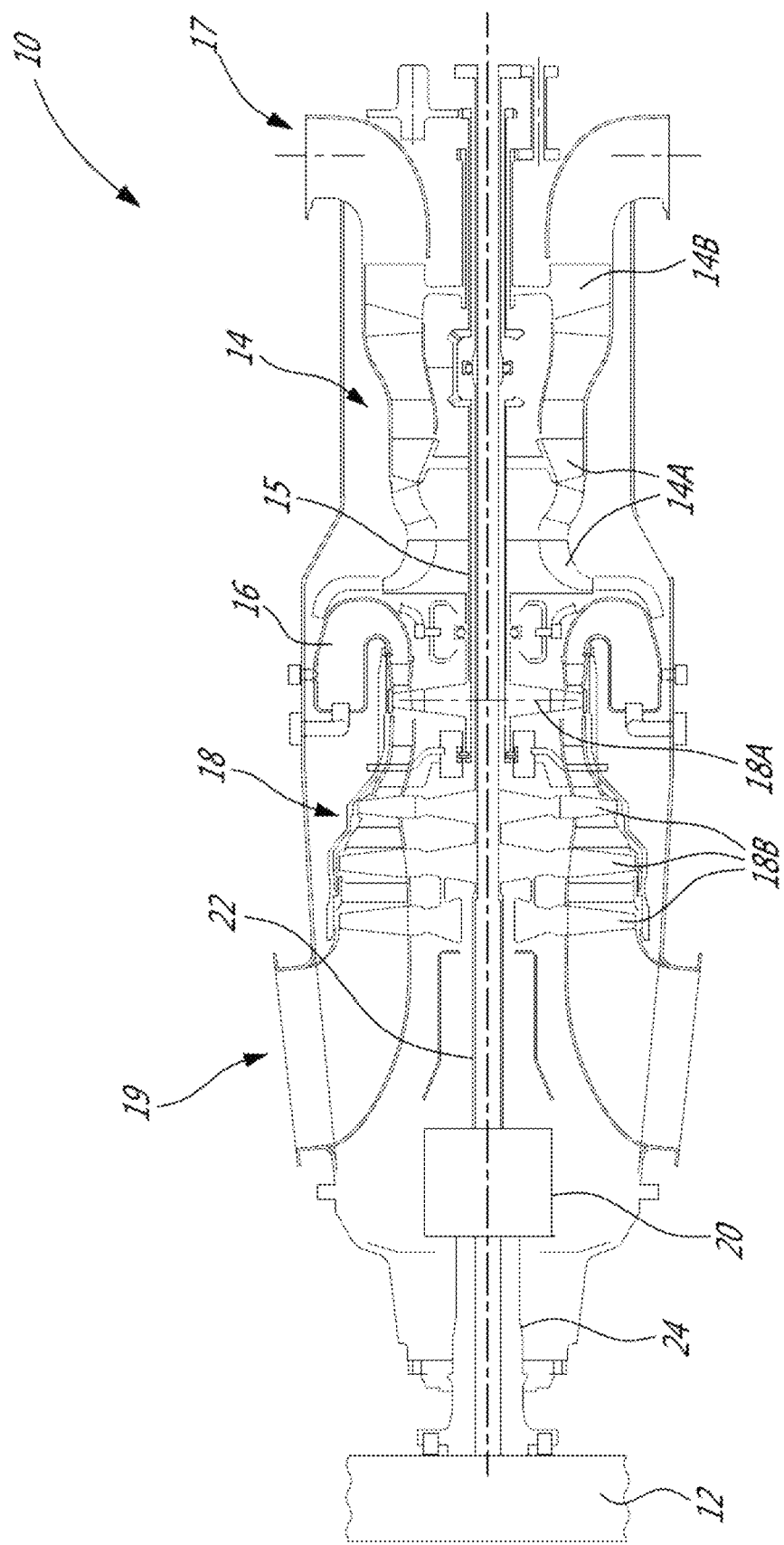
FIG. 1 is a schematic cross-sectional view of a gas turbine engine.

FIG. 1 illustrates a gas turbine engine 10 of a type preferably provided for use in subsonic flight and configured for driving a load 12, such as, but not limited to, a propeller or a helicopter rotor. Depending on the intended use, the engine 10 may be any suitable aircraft engine. For example, the engine 10 may be gas turbine engine, such as a turboprop engine, or a turboshaft engine, an intermittent combustion engine such as a Wankel engine, or a combination of one or more different engine types. In the present embodiment, the engine 10 is a gas turbine engine, and more particularly a turboprop, and generally comprises in serial flow communication a compressor section 14 for pressurizing the air, a combustor 16 in which the compressed air is mixed with fuel and ignited for generating an annular stream of hot combustion gases, and a turbine section 18 for extracting energy from the combustion gases.

The exemplary embodiment shown in FIG. 1 is a "reverse-flow" engine because gases flow from the inlet 17, at a rear portion of the engine 10, to the exhaust outlet 19, at a front portion of the engine 10. This is in contrast to "through-flow" gas turbine engines in which gases flow through the core of the engine from a front portion to a rear portion. The engine 10 may be a reverse-flow engine (as illustrated) or a through-flow engine.

In the illustrated embodiment, the turbine section 18 has a high-pressure turbine 18A in driving engagement with a high-pressure compressor 14A. The high-pressure turbine 18A and the high-pressure compressor 14A are mounted on a high-pressure shaft 15. The turbine 18 has a low-pressure turbine, also known as power turbine 18B configured to drive the load 12. The power turbine 18B is configured to drive a low-pressure compressor 14B through a low-pressure shaft 22. A planetary gearbox 20 is configured as a reduction gearbox and operatively connects the low-pressure shaft 22 that is driven by the power turbine 18B to a shaft 24 that is in driving engagement with the load 12, while providing a reduction speed ratio therebetween. In the present embodiment, the load 12 is a rotor of an aircraft, and more particularly a propeller 12, and thus the shaft 24 driving the aircraft rotor 12 is referred to as a rotor shaft.

The planetary gearbox 20 allows the load 12 to be driven at a given speed, which is different than the rotational speed of the low-pressure turbine 18B. The planetary gearbox 20 allows both the load 12 and the low-pressure turbine 18B to rotate at their respective optimal speed which are different. In the embodiment shown, the planetary gearbox 20 is axially mounted at the front end of the engine 10.

Now referring to FIGS. 1-4, the planetary gearbox 20 may also be referred to as an epicyclic gear train, an epicyclic gearbox, etc., but is referred to herein as a planetary gearbox for clarity. The planetary gearbox 20 has a sun gear 32 mounted on a sun gear connector 34 which is connected to a layshaft 22a that is connected the low-pressure shaft 22, although other operative connections are also contemplated. For example, in an alternate embodiment, the sun gear 32 may be connected directly to the low-pressure shaft 22. The layshaft 22a, also known as a torque shaft, is may twist along its rotational axis by a certain amount. The twist of the layshaft 22a may be monitored to indicate the torque that it transmits.

The planetary gearbox 20 further has a set of planet gears 36 rotatably mounted on respective shafts 38. In the present embodiment, there are three planet gears 36, although the planetary gearbox 20 may have two or more than three planet gears 36. In the embodiment shown, all of the shafts 38 of the planet gears 36 are connected to a planetary gear carrier 40 via respective bearings or any other suitable rotational assemblies. In the illustrated embodiment, the planetary gear carrier 40 is rotatable about a central rotation axis (X) relative to a housing (H) of the planetary gearbox 20.

Although in other embodiments a different operative connection may be used, in the present embodiment a connector 44 connects the planetary gear carrier 40 to the rotor shaft 24 to transmit rotation of the planetary gear carrier 40 to the load 12. As an example, alternatively, the planetary gear carrier 40 may be connected directly to the rotor shaft 24. In some embodiments, the planetary gear carrier 40 may be a zero-twist carrier to reduce twist deflection under torque by driving the planet gears 36 from an axial position corresponding to a symmetry plane of the planet gears 36. In a particular embodiment, the zero-twist carrier is as described in U.S. Pat. No. 6,663,530 which is incorporated herein by reference in its entirety.

Each planet gear 36 has a main (larger-diameter) gear 46, a fore and aft (smaller-diameter) gears 48 disposed on opposite sides of and attached to the main gear 46 via any suitable construction and/or method to rotate integrally with the main gear 46. The main gears 46 are meshed with the sun gear 32. In the illustrated embodiment, the main gears 46 and the sun gear 32 are spur gears, but other types of gears may be used, such as helical gears. In the embodiment shown, a diameter 50 of the sun gear 32 is inferior to a diameter 52 of the main gears 46 to create a first rotational speed ratio to the planetary gearbox 20, between the sun gear 32 and the main gears 46 of the planet gears assemblies 36. In some embodiments, one or more of the planet gears 36 may each have only one smaller-diameter gear 48.

Figure 2:
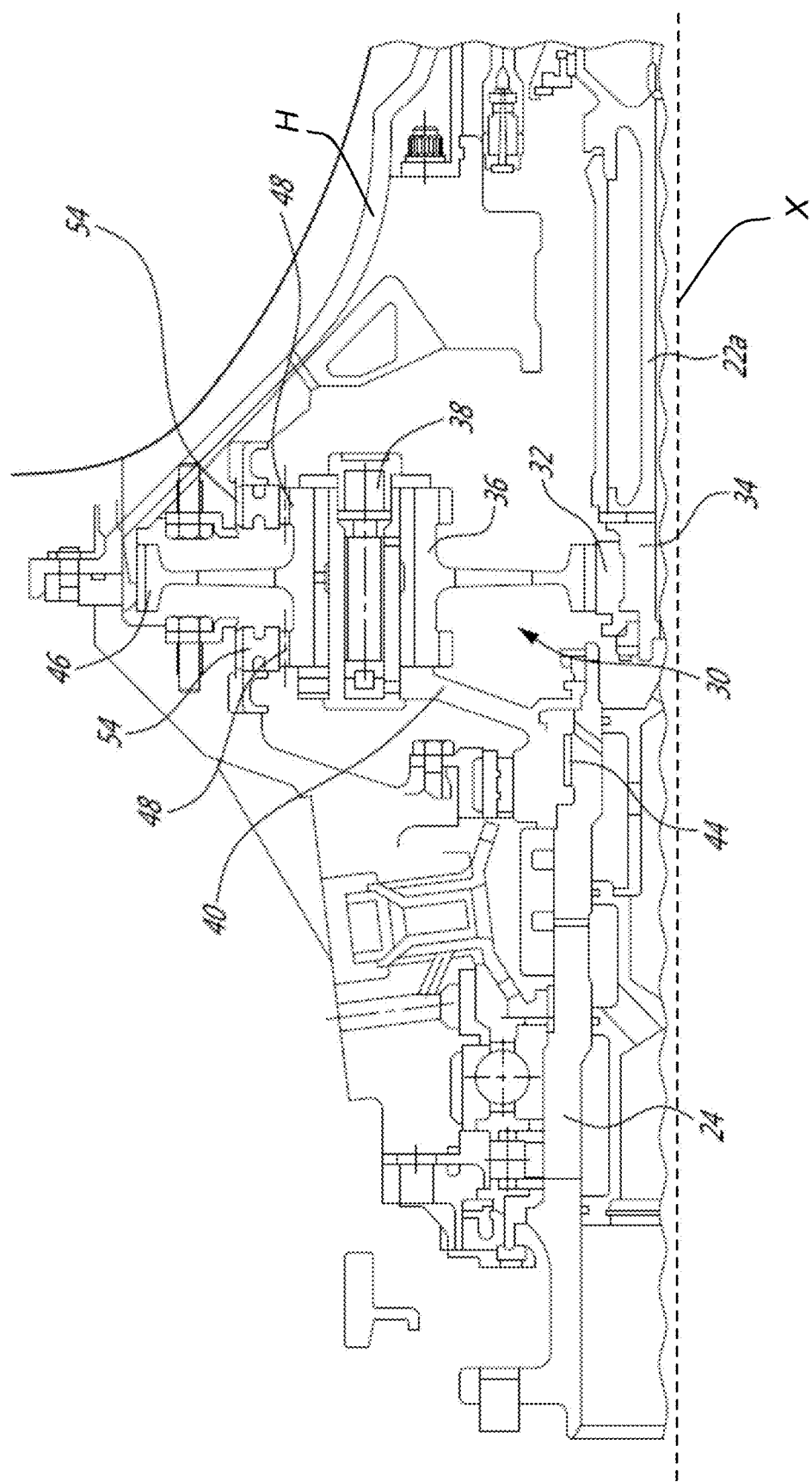
FIG. 2 is a cross-sectional view of a portion of the gas turbine engine illustrating a planetary gearbox.
Figure 3:
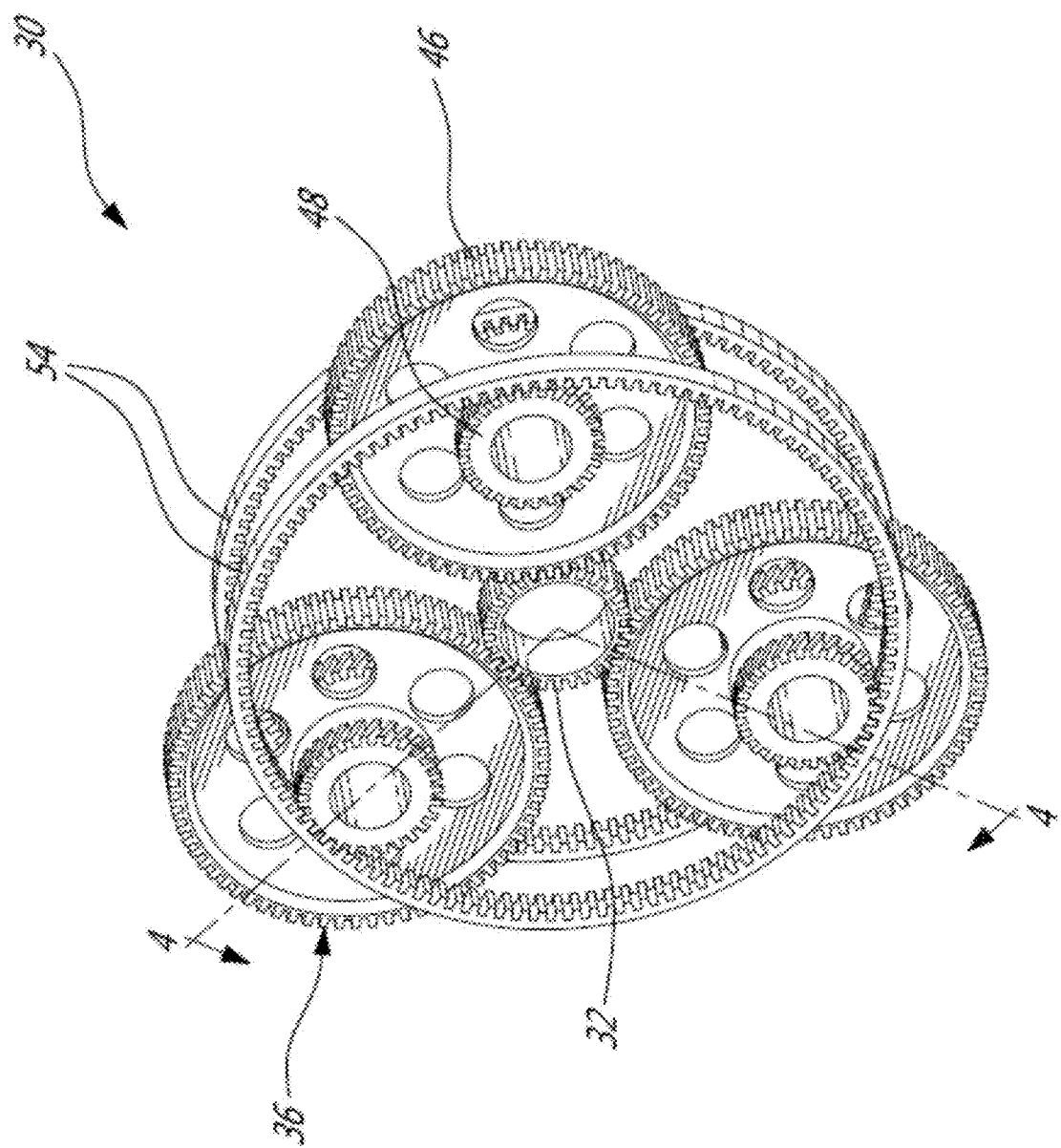
FIG. 3 is a three-dimensional view of the planetary gearbox of FIG. 2.
Figure 4:
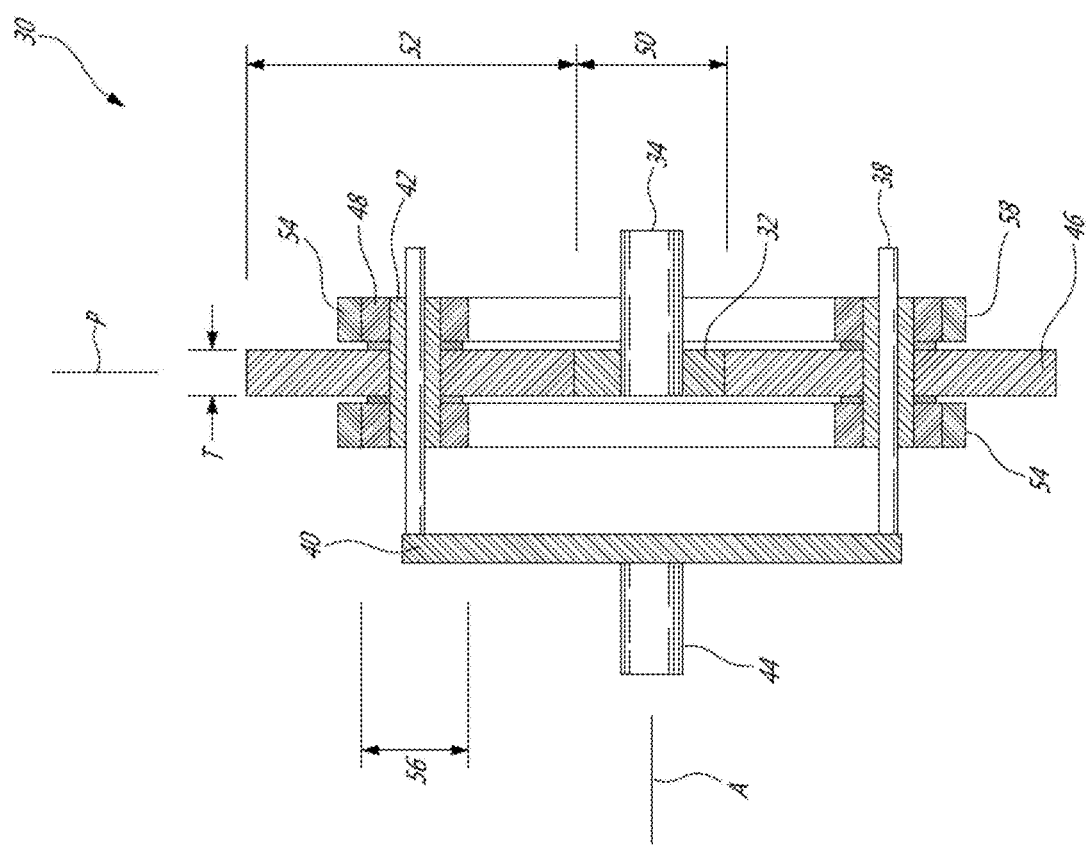
FIG. 4 is a cross-sectional view along line 4-4 of the planetary gearbox of FIG. 3.

Referring to FIGS. 2 and 3, in the present embodiment and although not necessarily in all embodiments, the planetary gearbox 20 has two ring gears 54 that are meshed with the smaller-diameter gears 48 of the planet gears assemblies 36. In the present non-limiting embodiment, the ring gears 54 are disposed on each side of the main gears 46, symmetrically, so that the reaction load on the bearings is equalised along their longitudinal axis. The ring gear(s) 54 may be spur gears and/or helical gears for example, depending on each given embodiment of the gearbox 20 and of the other gears of the gearbox 20. Helical gears may be quieter in some applications.

In a particular embodiment, teeth of the fore gears 48 may be angled in an opposite way relative to teeth of the aft gears 48 such that the fore and aft gears 48 may be mirrored relative to one another. In operation, the larger-diameter gears 46 of such a non-limiting embodiment may tend to self-center under torque relative to the sun gear 32. This may enhance the load sharing between the ring gears 54. In the embodiment shown, a diameter 56 of the fore and aft gears 48 is inferior to the diameter 52 of the main gears 46. Accordingly, a second rotational speed ratio between the planet gears 36 and the ring gears 54 is generated by the planetary gearbox 20.

The planetary gearbox 20 may provide a rotational speed ratio between the sun gear 32 and the planetary gear carrier 40 that would require at least two conventional planetary gearboxes to achieve. In a particular embodiment, less moving parts are required which may lead to cost and weight reduction of the gas turbine engine 10. Furthermore, the moving parts of such gearboxes require lubrication. By having fewer parts, less oil may be required. This may reduce the capacity of the required oil system and, because less heat is generated, the size of the required heat exchanger used to cool down the oil of the planetary gearbox 20 may be reduced. In a particular embodiment, a total length of the gas turbine engine 10 may be reduced by having the planetary gearbox 20 as described herein instead of at least two conventional gearboxes disposed in series in the engine 10 to achieve a speed reduction ratio equivalent to the planetary gearbox 20.

In the illustrated embodiment, the turbine shaft 22 is operatively connected to the sun gear 32. The rotor shaft 24 is connected to the connector 44 of the planetary gear carrier 40, for instance by spline connection, and is hence operatively connected to the planetary gear carrier 40. In the present embodiment, rotation of the ring gears 54 is limited, for example by the ring gears 54 being fixed to the housing (H) as shown in FIG. 2. It is understood that in the present embodiment rotation of the ring gears 54 is limited by being blocked (i.e. the ring gears 54 are non-rotational relative to the housing (H). In other embodiments, rotation of the ring gears 54 may be partially and/or variably limited, so as to vary the gear ratio provided by the planetary gearbox. The speed reduction ratio is defined as the rotational speed of the input (in this embodiment, the low-pressure shaft 22/sun gear 32) over the rotational speed of the output (in this embodiment, the rotor shaft 24). In this arrangement, the shafts 22 and 24 rotate in the same direction relative to one another.

In an alternate embodiment, a star arrangement may be used. In a star arrangement, rotation of the planetary gear carrier 40 is limited and the rotor shaft 24 is operatively connected to the ring gears 54. It is understood that limiting rotation of the planetary gear carrier 40 comprises completely blocking the rotation of said carrier. In this alternate embodiment, the ring gears 54 are both mounted and linked to the rotor shaft 24. In this alternate embodiment, the rotor shaft 24 and the turbine shaft 22 rotate in opposite directions.

By having two ring gears 54 disposed on opposite sides of the main gears 46 the load is symmetrically distributed relative to a plane P, to which an axis of rotation A of the sun gear 32 is normal, the plane P being located half way through a thickness T of the main gears 46. By symmetrically distributing the load, the planetary gearbox may be adapted to withstand higher torques and may be adapted to use plain bearings instead of heavier and more expensive rolling element bearings.

The planetary gearbox 20 may be used in a plurality of applications, other than gas turbine engines, in which a rotational speed ratio between two rotating components is required. In such an embodiment, an input is provided to one of the sun gear 32, the planetary gear carrier 40, and the ring gears 54 and an output is connected to another one of the sun gear 32, the planetary gear carrier 40, and the ring gears 54. Rotation of a remaining one of the sun gear 32, the planetary gear carrier 40, and the ring gears 54, that is not connected to the input or the output, is limited.

The planetary gearbox 20 is adapted to change a rotational speed of a rotating component relative to another rotating component. In the illustrated embodiment, the rotating component is the low-pressure shaft 22 and the other rotating component is the shaft 24. In the illustrated embodiment, the shaft 24 is connected to the load 12, but it may be connected to any other suitable component such as, but not limited to, a helicopter rotor, or an accessory of the gas turbine engine 10.

To change the rotational speed of the shaft 24 relative to the shaft 22, the planetary gearbox 20 first receives a torque of the low-pressure shaft 22 via the sun gear 32. Then, the torque is transmitted to main gears 46 of a set of planet gears 36 meshed with the sun gear 32. Each planet gear 36 comprises aft and fore gears 48 disposed on opposite sides of the main gear 46. In the illustrated embodiment, a first rotational speed ratio is generated by having a diameter 50 of the sun gear 32 inferior to a diameter 52 of the main gears 46.

The torque is then transmitted from the fore and aft gears 48 to one of the planetary gear carrier 40 and the ring gears 54 meshed with the fore and aft gears 48, while another one of the planetary gear carrier 40 and the ring gears 54 is fixed so as not to rotate. A second rotational speed ratio is generated by having the diameter 56 of the fore and aft gears 48 inferior to the diameter 52 of the main gear 46. The diameters 50, 52, and 56 may be tuned to achieve the desired reduction ratio.

Figure 5:
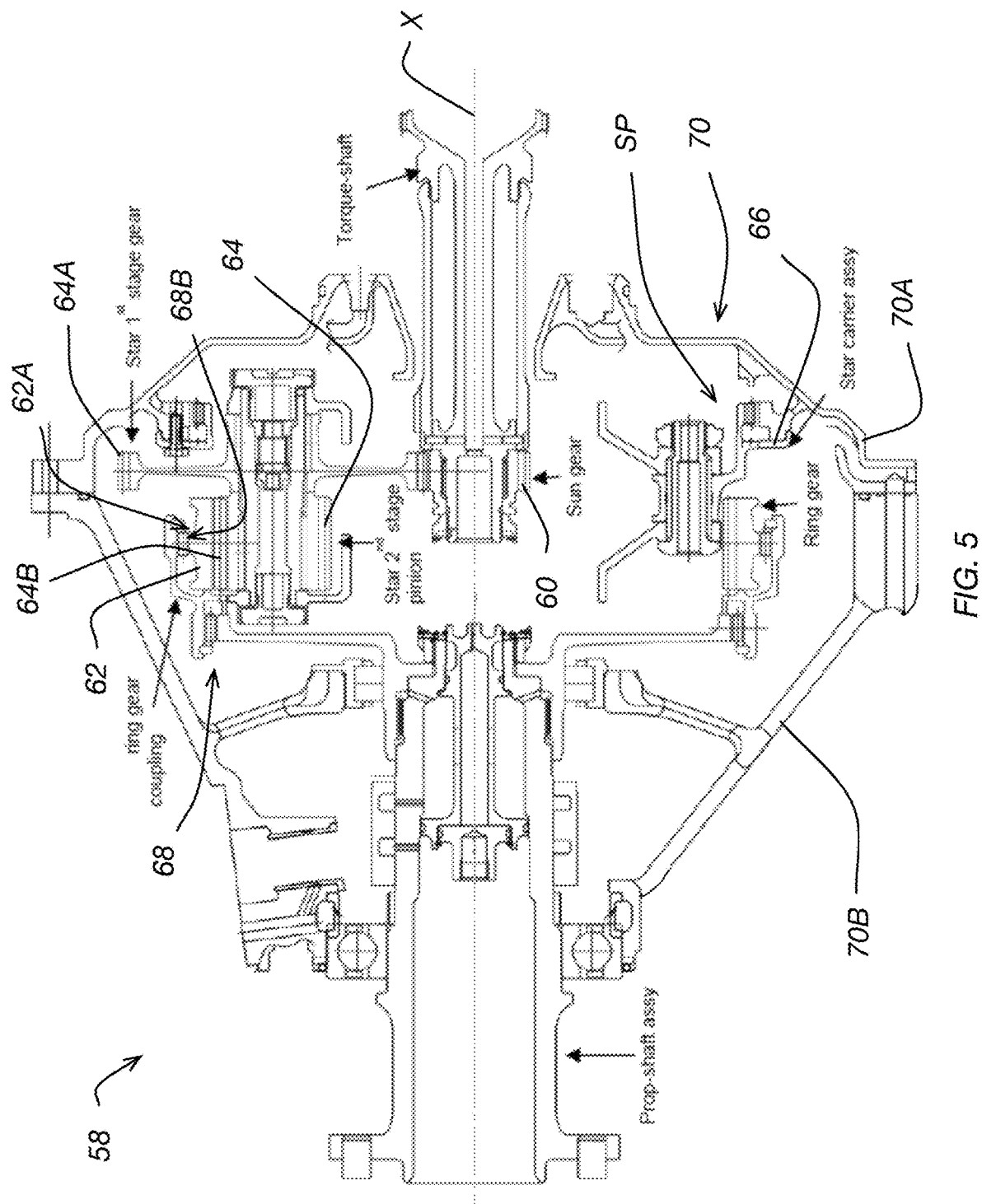
FIG. 5 is a cross-sectional view of a planetary gearbox according to another embodiment.
Figure 6:
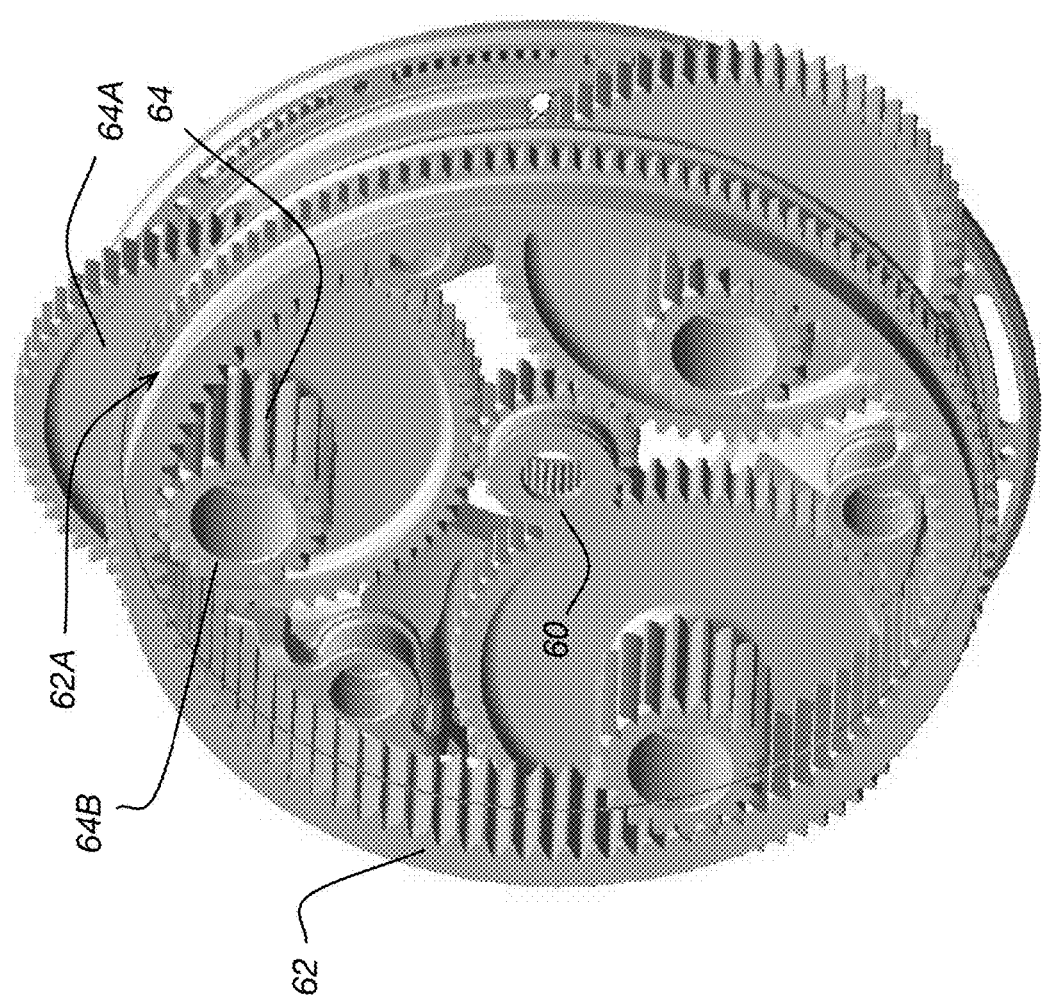
FIG. 6 is a three-dimensional view of a portion of the planetary gearbox of FIG. 5.

Referring now to FIG. 5, another epicyclic gearbox 58 is shown. The gearbox 58 includes an input defined by a sun gear 60, and an output defined by a ring gear 62. A plurality of star gears 64 of the gearbox 58 carried by a carrier 66 operatively connect the input 60 to the output 62. More particularly, each of the star gears 64 includes a larger-diameter gear 64A (a.k.a. first stage gear 64A) meshed to the sun gear 60, and a smaller-radius gear 64B (a.k.a. second stage gear 64B) attached to that larger-radius gear 64A (in this embodiment, but not necessarily in all embodiments, by being integral to that larger-radius gear 64A) and meshed with the ring gear 62. A ring gear coupling 68 is splined to a radially-outward facing surface 62A of the ring gear 62 (in this embodiment, but not necessarily in all embodiments, via its free splines at each end, which engage the ring gear 62 and thus engage the output shaft 24) to receive torque from the ring gear 62 and hence to be rotated by the ring gear 62 about a respective rotation axis (X). More particularly, and as seen in FIG. 5, the radially-outward facing surface 62A of the ring gear 62 has radially-outwardly facing teeth which mate with radially-inwardly facing teeth defined by a radially-inwardly facing surface 68B of the ring gear coupling 68.

Figure 7:
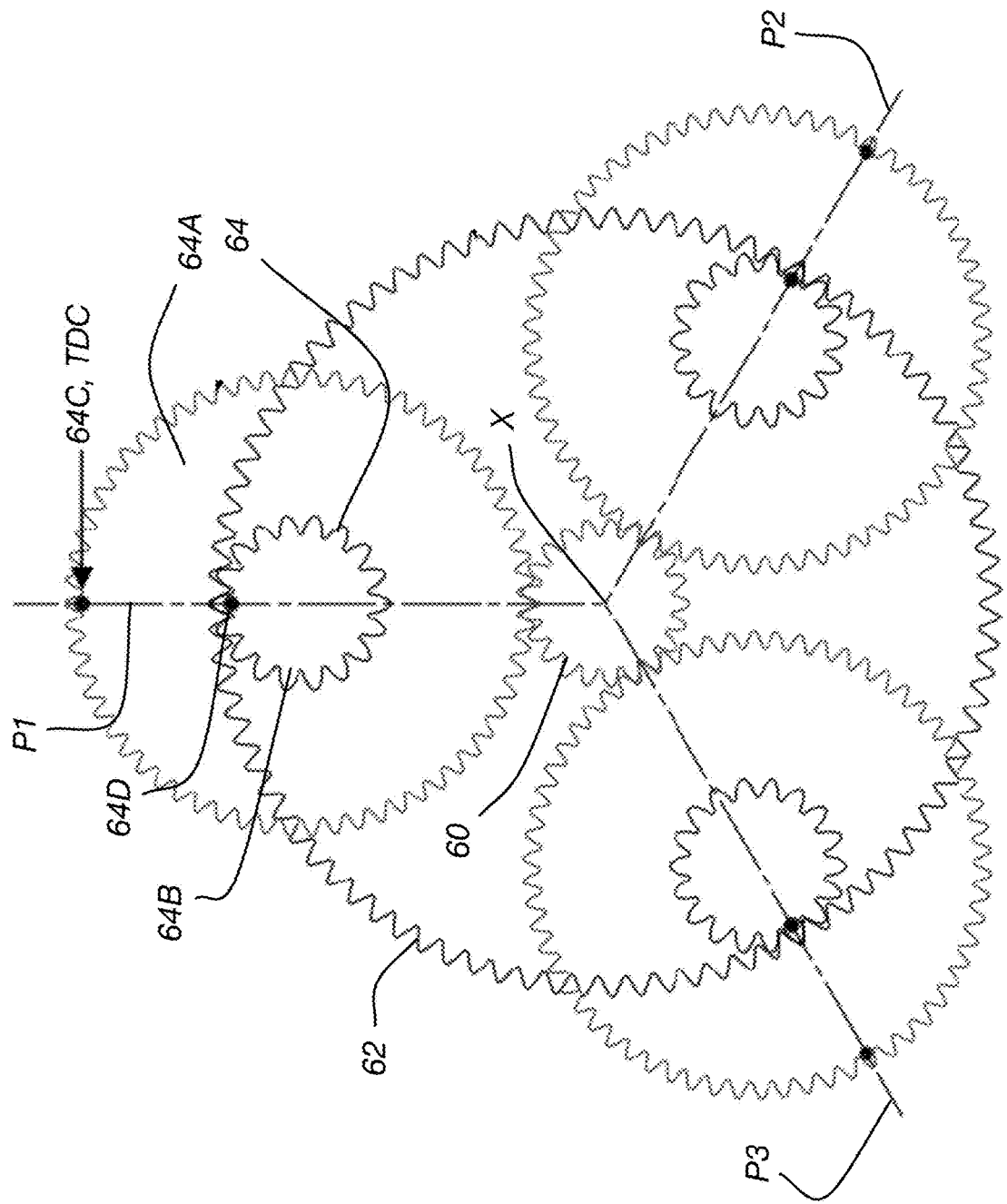
FIG. 7 is a schematic elevation view of the gears of the gearbox of FIG. 5 showing an alignment of the gears with corresponding markings.

In this embodiment, the sun gear 60, the ring gear 62, the planet gear carrier 66, and the ring gear coupling 68 are coaxial. Referring to FIG. 7, as shown, in this embodiment, the gears 64, and more particularly in this embodiment the first stage gear 64A and second stage gear 64B in this embodiment, are attached to each other, for example by being electron beam (EB) welded together, or by any other suitable manufacturing/method/construction, so that one tooth of each first stage gear 64A is aligned with one tooth of a corresponding second stage gear 64B and with one tooth of the ring gear 62 (i.e. as shown in FIG. 7 with respective planes at 12 o'clock, 4 o'clock, and 8 o'clock, each of which planes contains the rotation axis of the sun gear 60 and one tooth of each respective set of first stage gear 64A, second stage gear 64B and the ring gear 62). Accordingly, as shown in FIG. 7, in the present embodiment the gearbox 58 includes three interconnected sets of three gears (i.e. each set having three interconnected gears, and the three sets sharing the ring gear 62). Each set includes one of the first stage gears 64A, one of the second stage gears 64B, and the ring gear 62, with one tooth of each of these three gears 62, 64A, 64B being aligned with one tooth of each of the other two of these three gears 62, 64A, 64B.

In this embodiment, and as shown in FIG. 7, this alignment is indicated by respective marks 64C, 64D on each of the gears 62, 64A, 64B in respective locations contained in respective ones of the planes. The number of teeth of each of these gears 62, 64A, 64B is one of: odd and even, whereas the number of the sun gear 60 and the ring gear 62 is divisible by the number of star gears 64. In an aspect, such an arrangement provides a reduction in possible spacing error. In an aspect, while possibly absent in some embodiments, the marking may help make assembly easier. While in this embodiment this is the case, the marks 64C, 64D need not be positioned at top-dead-centre position (TDC) in all embodiments. In some embodiments, assembly may further be facilitated by using a slave sun gear (not shown) to mesh with the star first stage gears 64A before assembly of the gearbox 58. In some embodiments, teeth of the ring gear 62, the larger-radius gears 64A and the smaller-radius gears 64B may be shaped such that when assembled and relative to the rotation axis X, the apex of each tooth of each of the smaller-radius gears 64B arrives at a top-dead-centre position (TDC) (i.e. the position furthest from the rotation axis X) simultaneously with the apex of a tooth of a corresponding one of the larger-radius gears 64A, and these apexes may be aligned with the apex of the trough of a space between the teeth of the ring gear engaged at that time by the top-dead-centre position (TDC) tooth of the corresponding smaller-radius gear 64B.

This alignment is shown with planes P1, P2, P3 that contain the rotation axis X and divide the 360-degrees about the rotation axis X into equal 120-degree parts, with one of the planes P1 being aligned with the top-dead-centre position (TDC). Respective marks 64C, 64D may be provided on the gears 62, 64A, 64B to help during assembly. As an example, in this embodiment markings 64C, 64D may be provided at locations that correspond to and indicate the top-dead-center position (TDC) and include a marking on each of the larger-radius gears 64A, on each of the smaller-radius gears 64B, and on the ring gear(s) 62. In some embodiments, the gearbox 20 has a similar alignment and similar markings 64C, 64D. Because the alignment and markings 64C, 64D may be similar, FIG. 7 shows the alignment and the markings 64C, 64D for both the gearbox 20 and the gearbox 58.

Still referring to FIG. 5, the sun gear 60, the ring gear 62, the planet gear carrier 66, and the ring gear coupling 68 may be disposed within a housing 70 of the gearbox 58. The housing 70 includes a rear portion 70A and a front portion 70B removably connected to the rear portion 70A. A rotor shaft assembly 72 that may include a rotor shaft 72A and bearings 72B supporting its rotation, may be connected to the rear portion 70A so as to be removable relative to the rear portion 70A together with the front portion 70B. In some embodiments, such as the present, and not necessarily in all embodiments, the rotor shaft assembly 72 includes the ring gear 62 connected to the front portion 70B of the two part gearbox housing 70, and is a self-contained assembly unit, meaning it removes from the rear portion 70A as a single assembly piece. While providing some advantages in some applications, for facilitated assembly in comparison with at least some prior art designs of similar size and application, in other embodiments, the housing 70 may have a different number of parts and/or different construction. For example, additional housing parts may be disposed between the front and rear portions 70A, 70B such that the rear portion 70A would be operatively connected to the rear portion 70A to be removable from the rear portion 70A together with the rotor shaft assembly 72, with or without the one or more of the interposed parts.

In this embodiment, rotation of the carrier 66 is blocked relative to the rotation axis (X) by the carrier 66 being splined to the housing 70B, and in this particular embodiment to the rear portion 70A thereof. While the spline connection may provide some benefits such as relatively improved ease of assembly and maintenance, is contemplated that a different structure for blocking rotation of the carrier 66 may be used. In some embodiments, rotation of the carrier 66 may be limited, for example variably limited, relative to the rotation axis (X), so as to vary the overall gear ratio provided by the gearbox 58.

Figure 8:
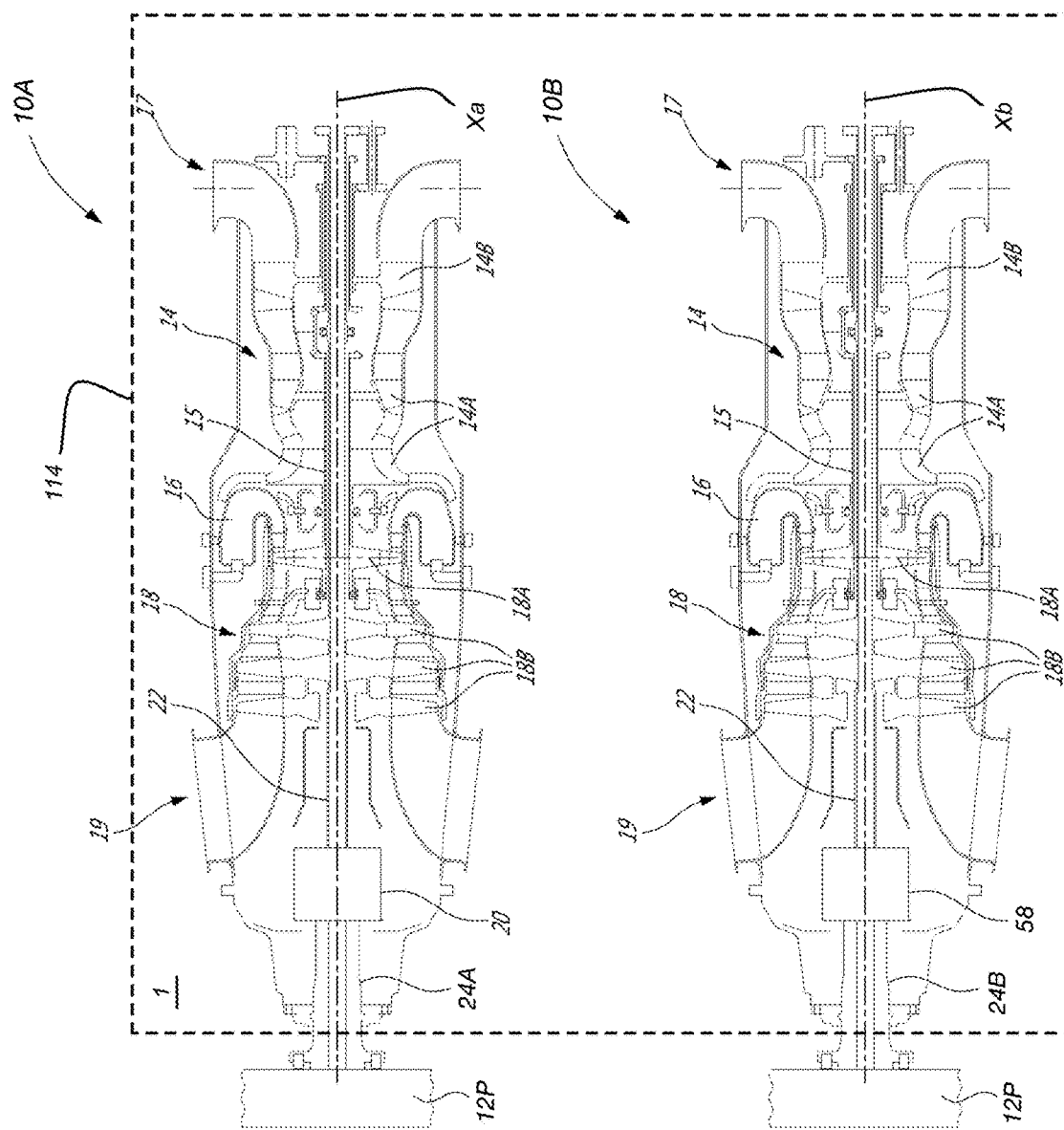
FIG. 8 is a schematic view of a multi-engine aircraft having the gearbox of FIG. 2 operatively connected to one of its engines and the gearbox of FIG. 5 operatively connected to another one of its engines.

Referring now to FIG. 8, an aircraft 1 is schematically shown. The aircraft has a first engine 10A, which may be the engine 10 described above, and a second engine 10B, which may be similar to the engine 10 described above except insofar as being equipped with the gearbox 58 instead of the gearbox 20. Connections between the engine 10B and the input and output of the gearbox 58 may be similar to the connections between the engine 10A and the input and output of the gearbox 20, and therefore these details are not repeated herein. As shown, the engines 10A, 10B drive respective rotors, which in this embodiment are propellers 12P. In other embodiments, the rotors may be different (e.g. in cases where the aircraft is a helicopter, the rotors may be helicopter rotors). In other embodiments, the engines 10A, 10B may drive a single output, such as helicopter rotor(s), via a suitable transmission for example. In such embodiments, the suitable transmission may be operatively disposed between the output and the gearboxes 20, 58 of the engines 10A, 10B.

In the present embodiment, when the engines 10A, 10B operate, the gearboxes 20, 58 drive the propellers 12P in opposite directions. For example, the propeller 12P of the engine 10A may be driven clockwise about the engine axis Xa of the engine 10A, in which case the propeller 12P of the engine 10B may be driven counter-clockwise about the engine axis Xb of the engine 10B. In other embodiments, the rotational directions may be reversed.

Now referring to FIG. 9, the present technology further provides a method 90 of operating a multi-engine aircraft 1, comprising: rotating a sun gear 32 of a first epicyclic gearbox 20 and a sun gear 60 of a second epicyclic gearbox 58, the sun gears 32, 60 meshed to respective planetary gears 36, 64 of the first and second epicyclic gearboxes 20, 58, rotating a planetary gear carrier 40 of the first epicyclic gearbox 20 relative to a ring gear 54 of the first epicyclic gearbox 20 and transmitting rotation of the planetary gear carrier 40 of the first epicyclic gearbox 20 to a first rotor shaft 24A of the aircraft 1; and rotating a ring gear 62 of the second epicyclic gearbox 58 relative to a carrier 66 of the second epicyclic gearbox 58 and transmitting rotation of the ring gear 62 of the second epicyclic gearbox 58 to a second rotor shaft 24B of the aircraft 1.

In some embodiments, the method 90 may include limiting rotation of at least one of: the ring gear 54 of the first epicyclic gearbox 20; and the carrier 66 of the second epicyclic gearbox 58. As seen above, in some embodiments, the limiting rotation of the at least one of the ring gear 54 of the first epicyclic gearbox 20 and the carrier 66 of the second epicyclic gearbox 58 includes blocking rotation of the at least one of the ring gear 54 of the first epicyclic gearbox 20 and the carrier 66 of the second epicyclic gearbox 58.

Further, in some embodiments, the method 90 may include blocking rotation of the carrier 66 of the second epicyclic gearbox 58 by maintaining a splined connection (as described above for example) between the carrier 66 of the second epicyclic gearbox 58 to a housing 70 of the second epicyclic gearbox 58. In some embodiments, the method 90 may include variably limiting rotation of the carrier 66, for example to vary the gear ratio provided by the second epicyclic gearbox 58. In some embodiments, the method 90 may include variably limiting rotation of the ring gear 54 of the first epicyclic gearbox 20, for example to vary the gear ratio provided by the first epicyclic gearbox 20. In some such embodiments, the rotating the sun gear 32 of the first epicyclic gearbox 20 may be in a same direction as the rotating the sun gear 60 of the second epicyclic gearbox 58, transmitting rotation of the first rotor shaft to a first rotor of the aircraft, and transmitting rotation of the second rotor shaft to a second rotor of the aircraft, respectively.

In some such embodiments, the rotating the sun gear 32 of the first epicyclic gearbox 20 may be performed via a turbine section 18 of a first gas turbine engine 10A of the aircraft 1, and the rotating the sun gear 60 of the second epicyclic gearbox 58 is performed via a turbine section 18 of a second gas turbine engine 10B of the aircraft 1.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft, comprising:
first and second engines;
one or more aircraft rotors associated with the first and second engines;
a first epicyclic gearbox having: a) an output operatively connected at least one of the one or more aircraft rotors, and b) an input defined by a sun gear of the first epicyclic gearbox; and
a second epicyclic gearbox having: a) an output operatively connected to at least one of the one or more aircraft rotors, and b) an input defined by a sun gear of the second epicyclic gearbox; and
wherein:
the first engine is operatively connected to the input of the first epicyclic gearbox;
the second engine is operatively connected to the input of the second epicyclic gearbox;
each of the first and second epicyclic gearboxes has gears carried by a carrier, and a ring gear meshed with the gears,
the output of the first epicyclic gearbox is defined by the carrier of the first epicyclic gearbox, and
the output of the second epicyclic gearbox is defined by the ring gear of the second epicyclic gearbox.

2. The aircraft of claim 1, wherein rotation of the ring gear of the first epicyclic gearbox is blocked and rotation of the carrier of the second epicyclic gearbox is blocked.

3. The aircraft of claim 2, wherein each gear of the gears of the carrier of the second epicyclic gearbox includes:
a larger-radius gear meshed with the sun gear of the second epicyclic gearbox;
a smaller-radius gear attached to that larger-radius gear and meshed with the ring gear of the second epicyclic gearbox,
that larger-radius gear, that smaller-radius gear and the ring gear forming an interconnected set of three gears;
one tooth of each gear in the interconnected set of three gears is aligned with one tooth of each of the other two gears in the interconnected set of three gears;
each gear of the second epicyclic gearbox has a number of teeth;
the number of teeth of all three gears of the interconnected set of three gears is one of even and odd; and
the number of teeth of each of the sun gear and the ring gear of the second epicyclic gearbox is divisible by the number of gears of the carrier of the second epicyclic gearbox.

4. The aircraft of claim 3, wherein in each gearbox of the first and second epicyclic gearboxes, each of the gears of the carrier of that gearbox includes:
a larger-radius gear meshed with the sun gear of that gearbox,
a smaller-radius gear attached to that larger-radius gear and meshed with the ring gear of that gearbox, and
teeth of the larger-radius gear, the smaller-radius gear, and the ring gear are shaped such that, when rotating:
a) an apex of each tooth of the teeth of the larger-radius gear passes through a top-dead-center position concurrently with an apex of a tooth of the teeth of the smaller-radius gear, and
b) when in the top-dead-center position the apex of the tooth of the smaller-radius gear aligns with trough of a space between teeth of the ring gear engaged at that time by the tooth of the smaller-radius gear.

5. The aircraft of claim 4, wherein the output of the second epicyclic gearbox is operatively connected the at least one of the one or more aircraft rotors via a rotor shaft assembly; and the ring gear of the second epicyclic gearbox has a radially-inward facing surface and a radially-outward facing surface, and:
includes teeth on both the radially-inward facing surface and the radially-outward facing surface,
is mated with the smaller gear of each of the gears of the carrier of second epicyclic gearbox via the teeth on the radially-inward facing surface, and
is connected to the rotor shaft assembly via a splined connection that includes the teeth on the radially-outward facing surface.

6. The aircraft of claim 5, wherein:
the rotor shaft assembly includes a ring gear coupling; and
the ring gear coupling has teeth mated with the teeth on the radially-outward facing surface of the ring gear of the second epicyclic gearbox and defining the splined connection.

7. The aircraft of claim 6, comprising a marking provided on each of the larger-radius gears, on each of the smaller-radius gears, and on each of the ring gears, at respective locations corresponding to the top-dead-center position.

8. The aircraft of claim 7, wherein:
the second epicyclic gearbox includes a housing;
the ring gear coupling, the ring gear, the carrier, and the sun gear of the second epicyclic gearbox are disposed inside the housing; and
the carrier of the second epicyclic gearbox is splined to the housing.

9. The aircraft of claim 8, wherein:
the housing includes a rear portion and a front portion operatively connected to the rear portion to be removable from the rear portion; and
the rotor shaft assembly is connected to the front portion so as to be removable relative to the rear portion together with the front portion.

10. The aircraft of claim 1, wherein the first engine drives the sun gear of the first epicyclic gearbox in a given direction when the first engine operates, and the second engine drives the sun gear of the second epicyclic gearbox in the given direction when the second engine operates.

11. A multi-engine aircraft with multiple aircraft rotors, comprising:
a first engine operatively connected to an input of a first epicyclic gearbox, the input of the first epicyclic gearbox defined by a sun gear thereof, the first epicyclic gearbox having an output operatively connected to a first aircraft rotor of the multiple aircraft rotors; and
a second engine operatively connected to an input of a second epicyclic gearbox, the input of the second epicyclic gearbox defined by a sun gear thereof, the second epicyclic gearbox having an output operatively connected to a second aircraft rotor of the multiple aircraft rotors; and
wherein each of the first and second epicyclic gearboxes has gears carried by a carrier and a ring gear meshed with the gears of that carrier, the output of the first epicyclic gearbox is defined by the carrier of the first epicyclic gearbox, and the output of the second epicyclic gearbox is defined by the ring gear of the second epicyclic gearbox.

12. The multi-engine aircraft of claim 11, wherein rotation of the ring gear of the first epicyclic gearbox is limited statically or variably, and rotation of the carrier of the second epicyclic gearbox is limited statically or variably.

13. The multi-engine aircraft of claim 12, wherein rotation of the ring gear of the first epicyclic gearbox is limited statically, and rotation of the carrier of the second epicyclic gearbox is limited statically.

14. A method of operating a multi-engine aircraft having first and second gas turbine engines, the method comprising:
rotating a sun gear in a first epicyclic gearbox of the first gas turbine engine and rotating a sun gear in a second epicyclic gearbox of the second gas turbine engine, the sun gears meshed to respective gears of the carriers of the first and second epicyclic gearboxes;
rotating a carrier of the first epicyclic gearbox relative to a ring gear of the first epicyclic gearbox and transmitting rotation of the carrier of the first epicyclic gearbox to a first rotor shaft of the aircraft; and
rotating a ring gear of the second epicyclic gearbox relative to a carrier of the second epicyclic gearbox and transmitting rotation of the ring gear of the second epicyclic gearbox to a second rotor shaft of the aircraft.

15. The method of claim 14, comprising limiting rotation of at least one of:
the ring gear of the first epicyclic gearbox; and
the carrier of the second epicyclic gearbox.

16. The method of claim 14, wherein the transmitting rotation of the ring gear of the second epicyclic gearbox to the second rotor shaft is performed via a radially-outward facing surface of the ring gear of the second epicyclic gearbox.

17. The method of claim 14, wherein the rotating the sun gear of the first epicyclic gearbox is in a same direction as the rotating the sun gear of the second epicyclic gearbox.

18. The method of claim 14, comprising transmitting rotation of the first rotor shaft to a first rotor of the aircraft, and transmitting rotation of the second rotor shaft to a second rotor of the aircraft.

19. The method of claim 18, wherein the first and second rotors are first and second propellers, respectively.

20. The method of claim 14, wherein:
- the rotating the sun gear of the first epicyclic gearbox is performed via a turbine section of a first gas turbine engine of the aircraft; and
- the rotating the sun gear of the second epicyclic gearbox is performed via a turbine section of a second gas turbine engine of the aircraft.

* * * * *